Feb. 1, 1955  N. BASHARK  2,701,117
GATE VALVE
Filed Oct. 26, 1949

Inventor
NICHOLAS BASHARK
By John N. Wolfram
Agent

United States Patent Office 2,701,117
Patented Feb. 1, 1955

2,701,117

GATE VALVE

Nicholas Bashark, Dayton, Ohio, assignor to The Parker Appliance Company, Cleveland, Ohio, a corporation of Ohio Application October 26, 1949, Serial No. 123,770

2 Claims. (Cl. 251—174)

The present invention relates to valves and more particularly to gate type valves in which a flat valve member is moved into and out of register with a port to close and open the valve.

It is an object of the invention to provide a gate type valve having a deformable rubberlike sealing element surrounding the port which is not subject to twisting or turning forces when the valve member moves across it in contact therewith.

It is another object of the invention to provide a valve of the type described in which the valve operating mechanism includes a rock shaft or stem which may be angularly reciprocated and means for translating such angular motion into straight line motion for the valve member.

It is another object to provide a gate type valve in which the valve gate is guided in the valve body and in which the guide surfaces are elongated so as to provide a relatively large area of contact.

It is another object to provide a gate valve having a flat valve member supported on one side by the casing and engageable on the other side by a deformable sealing element and in which means is provided for guiding the valve member between the support and the sealing element when entering the valve member therebetween.

Another object is to provide a gate valve having a valve chamber and a flat valve member therein, a support in the casing for one side of the valve member, a deformable sealing element on the other side of the valve member and movable into engagement therewith when the valve member is between the element and the support, and stop means for preventing the deformable member from being moved into contact with the support when the valve member is withdrawn from between the support and the sealing element.

It is another object to provide a pivotally actuated gate valve in which the operating stem moves angularly in an arc of approximately 90° to open or close the valve while the valve member moves in a straight line.

It is another object to provide a valve of the type described in which a rectangular gate is guided in straight line motion to and from open and closed positions and in which movement of the gate at either end of its travel is limited by engagement of the ends of the gate with the valve body.

Another object is to provide a gate type valve having pivoted means for moving the gate and in which the gate may move across the pivot point and thus facilitate the obtaining of a valve of minimum size and weight.

It is another object of the invention to provide a flat gate type valve of high grade functional characteristics yet of minimim size and bulk so as to be suitable for aircraft installations.

Other objects will be apparent from a detailed description and from the drawings in which.

Figure 1:
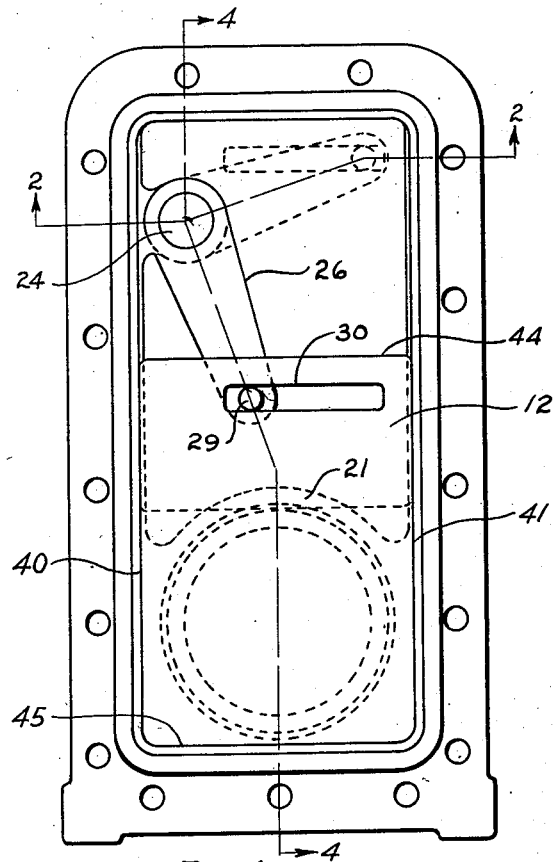
Fig. 1 is a view from the backside of the valve with the back cover or cap removed.
Figure 4:
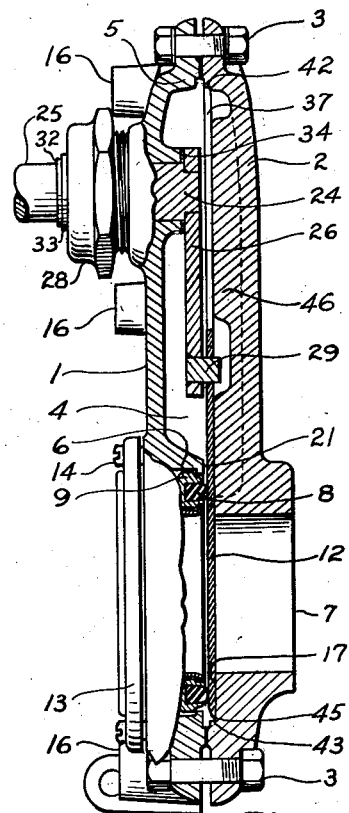
Fig. 4 is a cross-sectional view along the line 4—4 of Fig. 1 with the back cover replaced.
Figure 2:
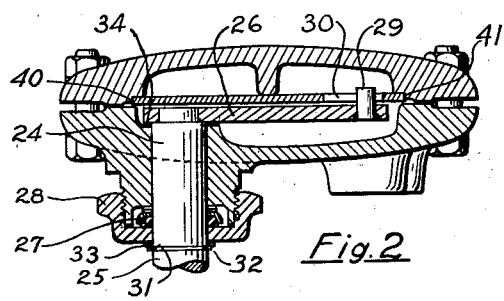
Fig. 2 is a cross-sectional view through line 2—2 of Fig. 1, except with the back cover or cap replaced.

The valve includes a casing comprised of a front cover or body member 1 and a back cover or cap 2 bolted together by a plurality of bolts 3 and forming a valve chamber 4 therebetween. A gasket 5 seals the joint between the body and cap. The casing is of rectangular shape as shown in Fig. 1 and at one end the body 1 has an inlet port 6 in alignment with an outlet port 7 in the cap 2. A sealing assembly generally designated as 9 and including a deformable gasket 8 is movably mounted within the port 6 and is attached to the wall of the port by a flexible diaphram 10 and pressed by a spring 11 toward the valve gate 12 to make sealing contact therewith. The sealing assembly is preferably of the type illustrated and which is claimed in assignee's copending application No. 15,645, although other forms may be used. A flat valve member or gate 12 is mounted within the valve chamber 4 and movable into and out of register with the ports 6 and 7 so as to close and open the same. Suitable mounting pads 16 may be provided on the valve casing for attaching the valve to a supporting structure, not shown.

Figure 5:
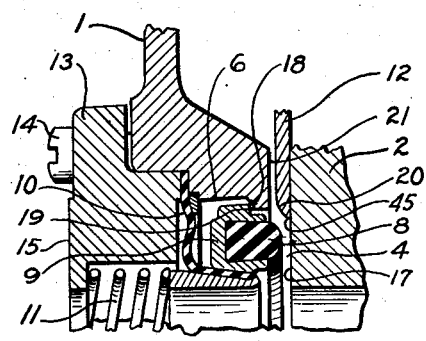
Fig. 5 is an enlarged fragmentary view showing a section through the sealing element and an opposed support for the valve member, the latter being in the open position.
Figure 3:
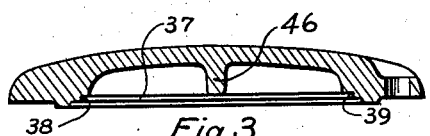
Fig. 3 is a cross-sectional view of the back cover along a line corresponding to line 2—2 of Fig. 1.

The cap 2 has a flat surface 17 surrounding the port 7 and opposite the sealing member 9. This flat surface serves as a support for the gate 12 when the latter is in closed position. When the valve is in the open position with the gate withdrawn from between the sealing member 9 and the supporting face 17, see Fig. 5, a stop shoulder 18 on the body 1 is engaged by a shoulder 19 on the sealing member 9 to prevent the spring 11 from moving the sealing member 9 across the valve chamber 4. The gasket 8 is thus prevented from contacting the supporting face 17. This avoids any unnecessary wear and cold set producing compression upon the gasket 8 when the valve is open and also provides a space between the gasket 8 and surface 17 to allow ready entrance of the valve member 12 therebetween when the latter is moved from open to closed position. From Fig. 5 it will be noted that the end of the valve member is completely withdrawn from contact with the gasket 8 when in open position thus avoiding unequal cold set producing compression of the gasket. It will also be noted that the end of the valve member is rounded as at 20 to further facilitate entrance between the gasket 8 and support 17 when moving the valve member from open to closed position.

The inner surface of the body 1 is formed with a portion 21 surrounding the sealing assembly 9 and lying close to valve member 12 so as to guide the latter as it moves toward and across the gasket 8. This further facilitates entrance of the valve member between the gasket 8 and support face 17 and prevents appreciable reverse movement of the sealing assembly 9 due to back pressure surges within the port 7 when the valve is closed.

A valve stem or shaft 24 is mounted at the other end of the valve casing and has a portion 25 extending therefrom which may be connected to either a manual or motor means, not shown, for operation thereof. The valve stem extends into the valve chamber 4 and is connected at its inner end by brazing, or any other suitable method, to one end of a crank arm 26 and is sealed by a suitable packing 27 retained by a packing gland 28.

The other end of the crank arm 26 has a pin 29 rigidly mounted thereon and extending into a slot 30 in one end of the valve member 12.

The valve stem 24 has a groove 31 receiving a split locking washer 32 which bears against a thrust washer 33 which in turn bears against the cap 28 to prevent inward motion of the stem. Within the valve chamber the arm 26 is brazed to the stem and bears against thrust washer 34 which in turn bears against the body 1 to prevent outward movement of the stem. The stem is therefore anchored against axial movement which might otherwise interfere with movement of the gate.

The valve cap 2 has a recessed portion 37 extending completely around the valve chamber 4 and providing a pair of straight parallel guide surfaces 38 and 39 engageable by the straight and parallel sides 40 and 41 of the valve member 12 to guide the latter in straight line motion to and from port opening and port closing positions. The recess 37 also provides end walls 42 and 43 engageable by the opposite ends 44 and 45 of the valve member for limiting movement of the latter.

A central rib 46 is provided on the upper end of the valve cap 2 and within the chamber 4 to support the central portion of the valve gate 12 as it is moved to the open position. The slot 30 in the valve member which receives the crank pin 29 extends across the valve member in a direction perpendicular to the parallel sides 40 and 41, although if desired it may be formed at an acute angle with these surfaces.

In order to provide pivoted actuation for the straight line motion of the valve member 12 and to accomplish this with a valve casing of minimum size and weight, the stem 24 is mounted at one side of the valve chamber 4 and extends only part way into the chamber so that the valve member may move across it in the open position. Thus the valve casing need only be of a size to provide a valve chamber long enough to contain the valve member at the opposite ends of its travel.

To operate the valve from the closed position as shown in the solid outline of Fig. 1, the valve stem 24 is rotated approximately 90° in the counter clockwise direction so that the crank arm 26 will assume the position shown in the dotted outline. Because of the engagement of the pin 29 with the slot 30 the valve member 12 will be raised to the dotted position as shown in Fig. 1 and its upward travel will be limited by the engagement of its upper end 44 with the shoulder 42 of the recess 37 in the cap 2. The slot 30 provides a slidable engagement with the crank pin 29 and the side walls 38 and 39 of the recess 37 guide the valve member 12 in straight line motion. The relatively long bearing contact between the sides 40 and 41 and the guide walls 38 and 39 prevents any appreciable twisting motion of the valve member and eliminates high frictional contact between the sides of the valve member and the recess 37. This reduces any tendency for the valve member to score or wedge against the guide surfaces 38 and 39 and facilitates the obtaining of a smoothly acting valve.

The straight line motion of the valve member across gasket 8 avoids any tendency to twist or rotate the latter and hence less opportunity to damage the same or its mounting means within the port. This is particularly of importance when the sealing assembly is mounted within the port 6 by means of a flexible diaphragm 10 as shown.

In the fully open position the valve member is completely withdrawn from between the gasket 8 and the support face 17 to avoid partial contact with the gasket which would lead to unequal cold setting compression as hereinbefore mentioned. The spring 11 urges the sealing assembly toward the surface 17 but the gasket 8 is prevented from seating thereagainst by the engagement of the shoulders 18 and 19.

To close the valve, the stem 24 is rotated 90° in the clockwise direction as viewed in Fig. 1. The surface 21 then guides the valve member 12 between the gasket 8 and the surface 17, easy entrance being effected without damage to the gasket 8 because of the rounded edge 20 of the valve member. Travel of the valve member in the closing direction is limited by the abutment of its end 45 with the end wall 43 of the recess 37.

Although only one form of the invention is illustrated in the drawings, it is obvious that many minor changes may be made coming within the scope of the following claims.

I claim:

1. In a valve, a casing having a valve chamber and a pair of aligned ports open to the chamber, a flexible diaphragm mounted in one of the ports, an annular sealing element attached to the diaphragm and movable within the port, a flat valve member within the chamber and movable across the sealing element into and out of registry with the ports for controlling flow of the fluid therebetween, yieldable means for normally biasing the sealing element into sealing contact with the valve member when the latter is moved across the sealing element, said valve member having a pair of straight parallel sides guided in the casing whereby said valve member is capable of straight line movement only when moving across the sealing element so as to avoid twisting strains upon the sealing element, an elongated slot in said valve member, means pivoted in said casing and engaging said slot for moving said valve member into and out of registry with the ports, said slot being located intermediate the ends of the parallel sides whereby the valve member is guided at points above and below the slot.

2. In a valve, a casing having a valve chamber, a pair of aligned ports open to the valve chamber, a flexible diaphragm mounted in one of the ports, an annular sealing element attached to the diaphragm and movable within the port, a flat valve member within said chamber and movable across the sealing element into and out of registry with the ports for controlling flow of fluid therebetween, yieldable means for normally biasing the sealing element into sealing contact with the valve member when the latter is moved across the sealing element, said valve member having a pair of straight parallel sides guided in the casing whereby said valve member is capable of straight line movement only when moving across the sealing element so as to avoid twisting strains upon the sealing element, narrow tract surfaces in the casing for supporting the valve member adjacent the parallel sides, surfaces in the casing opposite the tract surfaces closely confining the valve member to the tract surfaces, an elongated slot in the valve member, a shaft projecting through the casing wall at a point traversed by the valve member in moving into and out of registry with the ports, an arm rigidly connected at one end to the shaft and having its other end engaged in said slot, a stop on the shaft to limit the distance it may enter the casing, and a clearance between the arm and the valve member, said shaft being rotatable whereby the valve member may be moved into and out of register with the ports.

References Cited in the file of this patent

UNITED STATES PATENTS

| 653,600 | Wiley | July 10, 1900 |
| 895,072 | Chapman | Aug. 4, 1908 |
| 910,195 | Haskell | Jan. 19, 1909 |
| 1,049,450 | Caskey | Jan. 7, 1913 |
| 1,077,881 | Higgins | Nov. 4, 1913 |
| 1,296,746 | Bodmer | Mar. 11, 1919 |
| 2,000,853 | Lange | May 7, 1935 |
| 2,030,458 | McKellar | Feb. 11, 1936 |
| 2,203,989 | Hamer | June 11, 1940 |
| 2,230,600 | Olson | Feb. 4, 1941 |
| 2,370,751 | Prager | Mar. 6, 1945 |
| 2,390,201 | Bredenbeck | Dec. 4, 1945 |
| 2,417,400 | Snyder | Mar. 11, 1947 |

FOREIGN PATENTS

| 287,891 | Italy | Aug. 14, 1931 |
| 802,047 | France | May 30, 1936 |